United States Patent
Kawalkar et al.

(10) Patent No.: US 9,128,580 B2
(45) Date of Patent: Sep. 8, 2015

(54) SYSTEM AND METHOD FOR INTERACTING WITH A TOUCH SCREEN INTERFACE UTILIZING AN INTELLIGENT STENCIL MASK

(71) Applicant: HONEYWELL INTERNATIONAL INC., Morristown, NJ (US)

(72) Inventors: Amit Nishikant Kawalkar, Bangalore (IN); Hans Roth, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 118 days.

(21) Appl. No.: 13/708,320

(22) Filed: Dec. 7, 2012

(65) Prior Publication Data
US 2014/0164983 A1  Jun. 12, 2014

(51) Int. Cl.
G06F 3/048 (2013.01)
G06F 3/041 (2006.01)
G06F 3/0488 (2013.01)

(52) U.S. Cl.
CPC ............ *G06F 3/048* (2013.01); *G06F 3/04886* (2013.01)

(58) Field of Classification Search
CPC ... G06F 3/0481; G06F 3/0482; G06F 3/0488; G06F 3/04883
USPC .......................... 715/764, 718, 824; 345/173
See application file for complete search history.

(56) References Cited

U.S. PATENT DOCUMENTS

| | | | |
|---|---|---|---|
| 5,128,672 A | 7/1992 | Kaehler | |
| 5,689,619 A | 11/1997 | Smyth | |
| 5,764,222 A | 6/1998 | Shieh | |
| 5,870,083 A | 2/1999 | Shieh | |
| 5,956,020 A | 9/1999 | D'Amico et al. | |
| 6,160,536 A | 12/2000 | Forest | |
| 6,181,328 B1 | 1/2001 | Shieh et al. | |
| 6,459,424 B1 | 10/2002 | Resman | |
| 6,636,897 B1 | 10/2003 | Sherman et al. | |
| 6,831,631 B2 | 12/2004 | Chuang | |
| 7,176,902 B2 | 2/2007 | Peterson, Jr. et al. | |
| 7,289,102 B2 | 10/2007 | Hinckley et al. | |
| 7,295,191 B2 | 11/2007 | Kraus et al. | |
| 7,411,575 B2 | 8/2008 | Hill et al. | |
| 7,489,303 B1 | 2/2009 | Pryor | |

(Continued)

FOREIGN PATENT DOCUMENTS

WO   2010040207 A1   4/2010

OTHER PUBLICATIONS

USPTO Office Action for U.S. Appl. No. 13/162,679; Notification date Jan. 14, 2014.

(Continued)

*Primary Examiner* — Haoshian Shih
(74) *Attorney, Agent, or Firm* — Ingrassia Fisher & Lorenz, P.C.

(57) ABSTRACT

A system and method are provided for employing an intelligent stencil mask to interact with a touch screen interface and thereby reduce the probability of accidental control function activation. A touch screen interface onboard an aircraft is coupled to a processor and is configured to generate a first virtual mask having a first region and a second region. A user interaction is then detected with one of the first region and the second region. A first reconfigured virtual mask is generated if the user interacted with the second region. However, an aircraft control function is activated if the user interacted with the first region.

10 Claims, 8 Drawing Sheets

(56) References Cited

U.S. PATENT DOCUMENTS

| | | |
|---|---|---|
| 7,561,143 B1 | 7/2009 | Milekic |
| 7,693,869 B2 | 4/2010 | Hutson et al. |
| 7,730,401 B2 | 6/2010 | Gillespie et al. |
| 7,782,307 B2 | 8/2010 | Westerman et al. |
| 7,834,855 B2 | 11/2010 | Hotelling et al. |
| 7,847,789 B2 | 12/2010 | Kolmykov-Zotov et al. |
| 7,895,522 B2 | 2/2011 | Wong et al. |
| 8,018,440 B2 | 9/2011 | Townsend et al. |
| 8,085,252 B1 | 12/2011 | Lee et al. |
| 8,136,053 B1 | 3/2012 | Miller et al. |
| 8,471,783 B2 | 6/2013 | Rhodes |
| 2004/0150626 A1 | 8/2004 | Husman et al. |
| 2004/0212601 A1 | 10/2004 | Cake et al. |
| 2004/0218830 A1 | 11/2004 | Kang et al. |
| 2004/0234107 A1 | 11/2004 | Machida et al. |
| 2005/0243054 A1 | 11/2005 | Beymer et al. |
| 2006/0161871 A1 | 7/2006 | Hotelling et al. |
| 2006/0221061 A1 | 10/2006 | Fry |
| 2006/0279548 A1 | 12/2006 | Geaghan |
| 2007/0152976 A1 | 7/2007 | Townsend et al. |
| 2007/0268269 A1 | 11/2007 | Chang et al. |
| 2007/0273671 A1 | 11/2007 | Zadesky et al. |
| 2008/0042988 A1 | 2/2008 | Westerman et al. |
| 2008/0100586 A1 | 5/2008 | Smart |
| 2008/0158146 A1 | 7/2008 | Westerman |
| 2008/0165154 A1 | 7/2008 | Kim |
| 2008/0284739 A1 | 11/2008 | Andrews et al. |
| 2009/0058819 A1 | 3/2009 | Gioscia et al. |
| 2009/0082107 A1 | 3/2009 | Tahara et al. |
| 2009/0085894 A1 | 4/2009 | Gandhi et al. |
| 2009/0156363 A1 | 6/2009 | Guidi et al. |
| 2009/0174676 A1 | 7/2009 | Westerman |
| 2009/0174679 A1 | 7/2009 | Westerman |
| 2009/0244032 A1 | 10/2009 | Westerman et al. |
| 2009/0251432 A1 | 10/2009 | Wang et al. |
| 2009/0262089 A1 | 10/2009 | Wang |
| 2009/0273571 A1 | 11/2009 | Bowens |
| 2009/0296988 A1 | 12/2009 | Yamazaki et al. |
| 2009/0322683 A1 | 12/2009 | Tsuji et al. |
| 2009/0322687 A1 | 12/2009 | Duncan et al. |
| 2010/0020038 A1 | 1/2010 | Vogel et al. |
| 2010/0053095 A1 | 3/2010 | Wu et al. |
| 2010/0115473 A1 | 5/2010 | Reeves et al. |
| 2010/0127995 A1 | 5/2010 | Rigazio et al. |
| 2010/0146459 A1 | 6/2010 | Repka |
| 2010/0146463 A1 | 6/2010 | Cho et al. |
| 2010/0149130 A1 | 6/2010 | Jung et al. |
| 2010/0156795 A1 | 6/2010 | Kim et al. |
| 2010/0169766 A1 | 7/2010 | Duarte et al. |
| 2010/0188352 A1 | 7/2010 | Ikeda |
| 2010/0188371 A1 | 7/2010 | Lowles et al. |
| 2010/0194713 A1 | 8/2010 | Kawashima et al. |
| 2010/0207894 A1* | 8/2010 | Tsuei .............................. 345/173 |
| 2010/0225595 A1 | 9/2010 | Hodges et al. |
| 2010/0235793 A1 | 9/2010 | Ording et al. |
| 2010/0245258 A1 | 9/2010 | Stewart et al. |
| 2010/0269040 A1 | 10/2010 | Lee |
| 2010/0273533 A1 | 10/2010 | Cho |
| 2010/0289759 A1 | 11/2010 | Fisher et al. |
| 2010/0289768 A1 | 11/2010 | Nakao |
| 2010/0315267 A1 | 12/2010 | Chung et al. |
| 2010/0315371 A1 | 12/2010 | Katsu et al. |
| 2011/0006996 A1 | 1/2011 | Smith et al. |
| 2011/0012855 A1 | 1/2011 | Yeh et al. |
| 2011/0037705 A1 | 2/2011 | Yilmaz |
| 2011/0074544 A1 | 3/2011 | D'Souza |
| 2011/0090169 A1 | 4/2011 | Karhiniemi |
| 2011/0157172 A1 | 6/2011 | Bennett et al. |
| 2011/0175932 A1 | 7/2011 | Yu et al. |
| 2011/0187651 A1 | 8/2011 | Whitlow et al. |
| 2011/0187661 A1 | 8/2011 | Wakizaka et al. |
| 2011/0199327 A1 | 8/2011 | Shin et al. |
| 2011/0210926 A1 | 9/2011 | Pasquero et al. |
| 2011/0214162 A1 | 9/2011 | Brakensiek et al. |
| 2011/0227872 A1 | 9/2011 | Huska et al. |
| 2011/0254798 A1 | 10/2011 | Adamson et al. |
| 2011/0271216 A1 | 11/2011 | Wilson |
| 2011/0285645 A1 | 11/2011 | Cho et al. |
| 2011/0291944 A1 | 12/2011 | Simmons et al. |
| 2011/0291948 A1 | 12/2011 | Stewart et al. |
| 2011/0291985 A1 | 12/2011 | Wakako et al. |
| 2011/0310001 A1 | 12/2011 | Madau et al. |
| 2011/0316807 A1 | 12/2011 | Corrion |
| 2012/0011438 A1 | 1/2012 | Kim et al. |
| 2012/0013570 A1 | 1/2012 | Murata |
| 2012/0021806 A1 | 1/2012 | Maltz |
| 2012/0022720 A1 | 1/2012 | Deleris et al. |
| 2012/0036445 A1 | 2/2012 | Ganille et al. |
| 2012/0105486 A1 | 5/2012 | Lankford et al. |
| 2012/0154293 A1 | 6/2012 | Hinckley et al. |
| 2012/0242591 A1 | 9/2012 | Kawalkar |
| 2012/0254808 A1 | 10/2012 | Gildfind |
| 2013/0097566 A1 | 4/2013 | Burglund |
| 2013/0113719 A1 | 5/2013 | Griffin et al. |
| 2013/0249809 A1 | 9/2013 | Kawalkar et al. |
| 2014/0043241 A1 | 2/2014 | Sukumar |
| 2014/0082534 A1* | 3/2014 | Cleron et al. .................. 715/764 |
| 2014/0160048 A1* | 6/2014 | Conway et al. ............... 345/173 |
| 2014/0164983 A1 | 6/2014 | Kawalkar et al. |

OTHER PUBLICATIONS

USPTO Final Office Action, Notification Date Jul. 7, 2014; U.S. Appl. No. 13/427,336.

Himberg J., et al.; On-line Personalization of a Touch Screen Based Keyboard.

Simpson, R., et al.; Research in Computer Access Assessment and Intervention, NIH Public Access Author Manuscript, Phys Med Rehabil Clin N Am. Feb. 2010; 21(1): 15-32. doi:10.1016/j.pmr.2009.07.006.

Kawalkar, A. N.: Touch Screen Display User Interface and Method for Improving Touch Interface Utility on the same Employing a Rules-Based Masking System, filed with the USPTO on Mar. 22, 2012 and assigned U.S. Appl. No. 13/427,336.

Sukumar, S.: System and Method for Reducing the Effects of Inadvertent Touch on a Touch Screen Controller, filed with the USPTO on Aug. 7, 2012 and assigned U.S. Appl. No. 13/568,959.

Kawalkar A. N.: System and Method for Reducing the Probability of Accidental Activation of Control Functions on a Touch Screen, filed with the USPTO on Aug. 28, 2012 and assigned U.S. Appl. No. 13/597,021.

USPTO Notice of Allowance for U.S. Appl. No. 13/162,679 dated Feb. 24, 2014.

USPTO Office Action for U.S. Appl. No. 13/568,959 dated Aug. 20, 2014.

Uspto Office Action for U.S. Appl. No. 13/427,336 dated Dec. 4, 2014.

USPTO Office Action, Notification date Dec. 24, 2014; U.S. Appl. No. 13/597,021.

* cited by examiner

| PAGE ID | GRAPHICAL ELEMENT ID | LAYOUT DEFINITION | AFFORDANCE TYPE | SIGNIFICANCE LEVEL |
|---|---|---|---|---|
| 1 | ScrollList1 | Position, Size | List_Scroll | 4 |
|  |  |  | Item_Select | 8 |
|  | Button1 | Position, Size | TAP | 6 |
|  | Button2 | Position, Size | TAP | 6 |
|  | Button3 | Position, Size | TAP | 7 |
|  | Button4 | Position, Size | TAP | 7 |
|  | Button5 | Position, Size | TAP | 2 |
|  | Button6 | Position, Size | TAP | 2 |

FIG. 6

SYSTEM AND METHOD FOR INTERACTING WITH A TOUCH SCREEN INTERFACE UTILIZING AN INTELLIGENT STENCIL MASK

TECHNICAL FIELD

Embodiments of the subject matter described herein relate generally to touch screen interfaces. More particularly, embodiments of the subject matter described herein relate to a system and method for employing an intelligent stencil mask to interact with a touch screen interface and thereby reducing the probability of accidental control function activation.

BACKGROUND

Touch screen interfaces are being adopted as the primary input device in a variety of industrial, commercial, aviation, and consumer electronics applications. However, their growth in these markets is constrained by problems associated with inadvertent interactions; which may be defined as any system detectable interaction issued to the touch screen interface without the user's operational consent. That is, an inadvertent interaction may be caused by bumps, vibrations, or other objects, resulting in possible system malfunctions or operational errors. For example, potential sources of inadvertent interactions include but are not limited to accidental brushes by a user's hand or other physical objects. Accidental interactions may also be caused by a user's non-interacting fingers or hand portions. Furthermore, environmental factors may also result in inadvertent interactions depending on the technology employed; e.g. insects, sunlight, pens, clipboards, etc. Apart from the above described side effects associated with significant control functions, activation of less significant control functions may degrade the overall functionality of the touch screen interface.

One known approach for reducing inadvertent interactions on a touch screen interface involves estimating the intent of the user to activate a particular control function by analyzing the size and duration of a contact with the touch screen interface. Unfortunately, such systems do not differentiate between functions having varying levels of operational significance. For example, in relation to an avionics system, certain control functions operate significant avionics functions (e.g. engaging the auto-throttle), while other control functions are associated with less significant functions (e.g. a camera video display). Simply stated, the significance of the functionality being impacted by an inadvertent touch may range from a mere inconvenience to a possible safety issue.

In view of the foregoing, it would be desirable to provide a system and method for interacting with a touch screen interface that reduces inadvertent user interactions by utilizing a context sensitive, intelligent mask system.

BRIEF SUMMARY

This summary is provided to introduce a selection of concepts in a simplified form that are further described below in the detailed description. This summary is not intended to identify key or essential features of the claimed subject matter, nor is it intended to be used as an aid in determining the scope of the appended claims.

A method is provided for operating a touch screen interface. The method comprises generating a first virtual mask having a first region thereon and generating a first reconfigured virtual mask in response to a user interaction with the first region.

Also provided is a method for operating a touch screen interface on an aircraft touch screen controller. The method comprises generating a first virtual mask having a first region and a second region. A user interaction is then detected with one of the first region and the second region. A first reconfigured virtual mask is generated if the user interacted with the second region. However, an aircraft control function is activated if the user interacted with the first region.

Furthermore, a system for onboard an aircraft is provided. The system comprises a touch screen interface coupled to a processor that is configured to generate a first virtual mask on the touch screen interface having a first region thereon and generate a reconfigured virtual mask on the touch screen in response to detecting a user interaction with the first region.

BRIEF DESCRIPTION OF THE DRAWINGS

FIGS. 5 and 6 are illustrative exemplary implementations of a first virtual mask and a spreadsheet of the characteristics associated with each element contained in the user interface (UI) image, respectively;

DETAILED DESCRIPTION

Figure 1:
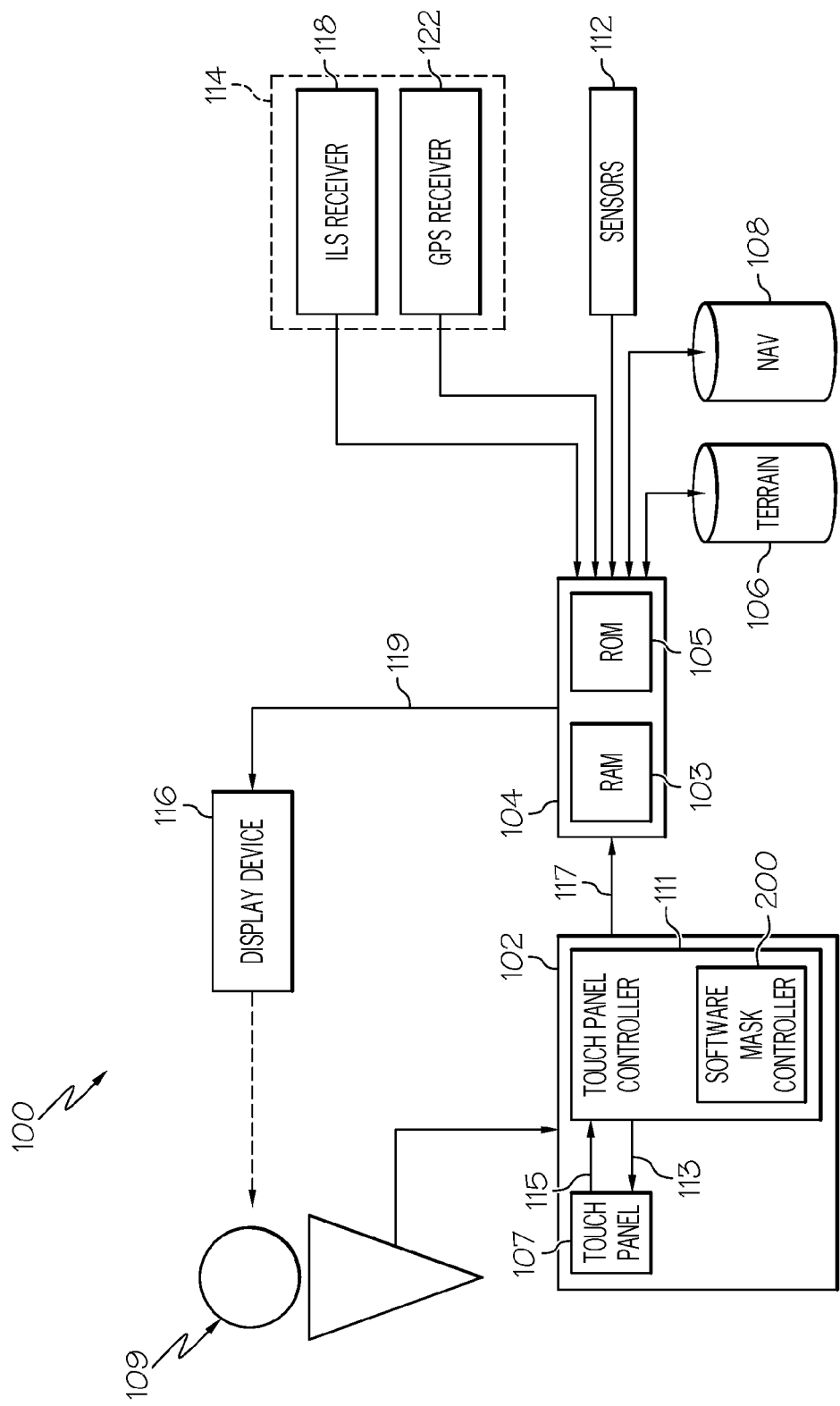
FIG. 1 is a block diagram of an aircraft cockpit display system including a touch screen display and a touch screen controller.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, touch screen displays, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Disclosed herein is a novel intelligent stencil mask system and method for interacting with a touch screen interface that reduces the possibility of inadvertent user interactions. This is accomplished through the use of a context sensitive software defined intelligent stencil mask. An intelligent stencil mask (hereinafter "virtual mask") is a software layer that is placed over the user interface image layer that prevents a direct user interaction or requires additional processing to achieve the user interaction. The virtual mask system enables users or developers to define interaction requirements with the touch screen interface that extend beyond the limits of a particular operating system or application to which the user's inputs are directed. Presented herein for purposes of explication are certain exemplary embodiments of how the virtual mask layer system may be employed on a particular device. For example, the embodiment of an interface suitable for use in aviation applications will be discussed. However, it should be appreciated that this explicated example embodiment is merely an example and a guide for implementing the novel systems and methods herein on any touch screen interface in any industrial, commercial, aviation, or consumer electronics application. As such, the examples presented herein are intended as non-limiting.

FIG. 1 illustrates a flight deck display system 100 includes a user interface 102, a processor 104, one or more terrain databases 106 sometimes referred to as a Terrain Avoidance and Warning System (TAWS), one or more navigation databases 108, sensors 112, external data sources 114, and one or more display devices 116. The user interface 102 is in operable communication with the processor 104 and is configured to receive input from a user 109 (e.g., a pilot) and, in response to the user input, supplies command signals to the processor 104. The user interface 102 may be any one, or combination, of various known user interface devices including, but not limited to, one or more buttons, switches, or knobs (not shown). In the depicted embodiment, the user interface 102 includes a touch screen display 107 and a touch screen controller (TSC) 111. The TSC 111 also contains a software mask controller 200, which will be fully described in connection with FIG. 2. TSC 111 provides drive signals 113 to a touch screen display 107, and a sense signal 115 is provided from the touch screen display 107 to the touch screen controller 111, which periodically provides a control signal 117 of the determination of a touch to the processor 104. The processor 104 interprets the controller signal 117, determines the application of the digit on the touch screen 107, and provides, for example, a controller signal 117 to the touch screen controller 111 and a signal 119 to the display device 116. Therefore, the user 109 uses the touch screen 107 to provide an input and the processing of the input is more fully described hereinafter.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. The ILS 118 provides aircraft with horizontal (or localizer) and vertical (or glide slope)

guidance just before and during landing and, at certain fixed points, indicates the distance to the reference point of landing on a particular runway. The GPS receiver 124 is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat screen displays such as various types of LCD (liquid crystal display) and TFT (thin film transistor) displays. The display devices 116 may additionally be implemented as a screen mounted display, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiment, however, one of the display devices 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

There are many types of touch screen sensing technologies, including capacitive, resistive, infrared, surface acoustic wave, and embedded optical. All of these technologies sense user interactions on a screen. A touch screen is disclosed that displays a UI image containing a plurality of elements. Each element is configured to display one or more symbols that describe the function of the element (e.g. autopilot). An element as used herein is a defined visible location on the touch screen that encompasses the symbol(s). Symbols as used herein are defined to include alphanumeric characters, icons, signs, words, terms, and phrases, either alone or in combination. A particular element is selected by sensing a user interaction (e.g. a digit of a figure or styles) contacting the touch screen interface.

Inadvertent user interactions may result from the accidental brush by a pilot's hand or any physical object capable of issuing detectable interaction to the touch sensor. These kinds of inadvertent interactions may be issued while the user is moving across the flight deck or due to jerks induced by the turbulence. Some inadvertent interactions are caused by environmental factors that depend upon the touch technology used in the system; e.g. insects, sunlight, pens etc. Ideally, all touches not intentionally issued by the pilot or crew member should be rejected; however, this would not be practical. A practical solution should consider the implication of an inadvertent interaction and subsequent activation of the control function; some may have a relatively minor effect and others may have more significant effects. In addition, the control function interface interaction characteristics (time on task, workload, accessibility, ease of use etc.) should remain equivalent to the interface available in non-touch screen flight decks or through alternate control panels. The following software mask controller in conjunction with a touch screen interface addresses the above issues and provides means for reducing inadvertent user interactions.

Figure 2:
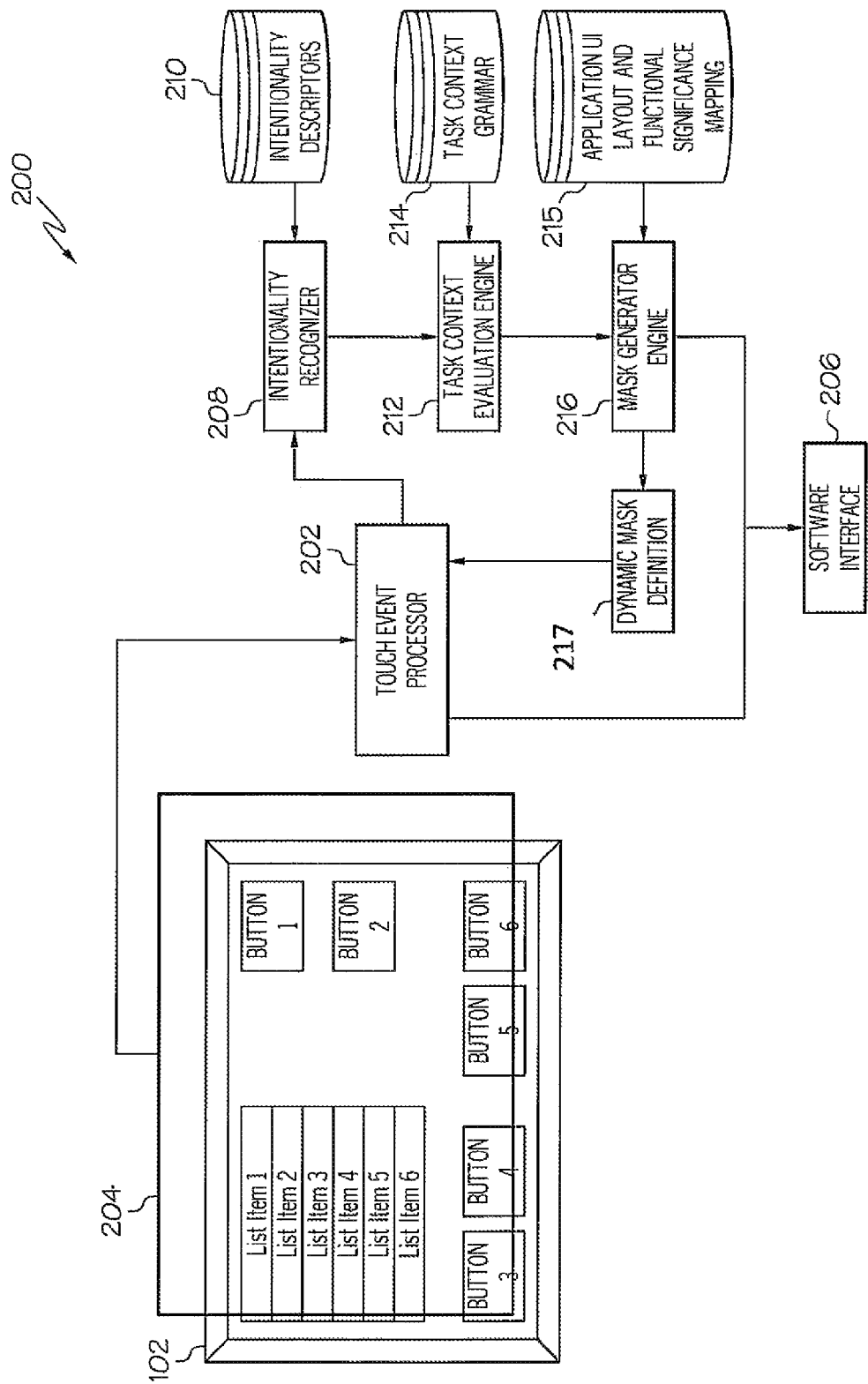
FIG. 2 is a block diagram of a software mask controller in accordance with an exemplary embodiment.

FIG. 2 is a block diagram of a software mask controller 200 in accordance with an exemplary embodiment. A touch screen interface 102 generates a user interaction in response to a detected touch. The generated user interaction is sent to a touch event preprocessor 202 for processing in accordance with a first virtual mask 204 stored in the dynamic mask definition database 217. If the touch event preprocessor 202 determines that the user interaction was within a first region of the first virtual mask, then the touch event preprocessor 202 passes the user interaction to the intentionality recognizer 208. However, if the touch event preprocessor 202 determines that the user interaction was located within a second region of the first virtual mask, the user interaction will be passed to the software interface 206.

The intentionality recognizer 208 utilizes an interaction intentionality method to compare the user interaction intentionality to a predetermined user interaction intentionality descriptor stored in the intentionality descriptors database 210. The comparison may be accomplished using various methods including but is not limited to that described below or those described in U.S. patent application Ser. No. 13/597,021 filed Aug. 28, 2012 entitled "System and Method for Reducing The Probability of Accidental Activation of Control Functions on a Touch Screen," and assigned to the same assignee.

Figure 3:
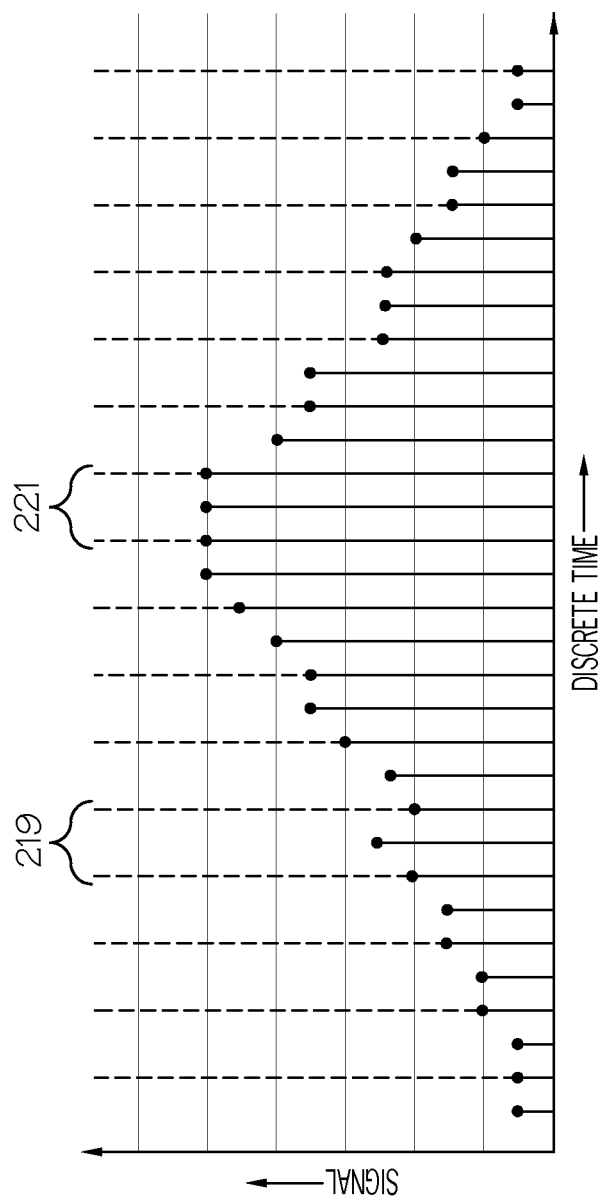
FIG. 3 illustrates an exemplary user interaction converted into a plurality of zones to provide a user interaction intentionality profile.

The intentionality recognizer 208 receives signal streams corresponding to a plurality of touch sensor parameters involved in the user interaction from the touch event preprocessor 202 and samples the signals over discrete time periods to separate the signal into a plurality of zones; e.g. 219, 221. The amplitude of each of the plurality of zones is weighted to generate the user interaction intentionality profile as shown in FIG. 3. The newly constructed user interaction intentionality is compared with corresponding predetermined user interaction intentionality descriptors stored in the intentionality descriptors database 210. Various factors will be accounted for when creating the predetermined user interaction intentionality including environmental conditions, touch screen technologies, and user interaction requirements.

The intentionality recognizer 208 determines if the predefined characteristic of the intentionality profile satisfies a predetermined characteristic associated with the predefined intentionality profile. If the intentionality profile satisfies the predetermined characteristic, the user interaction is accepted and sent to the task context evaluation engine 212. However, if the intentionality profile does not satisfy the predetermined characteristics, the user interaction is rejected and disregarded.

The task context evaluation engine 212 accepts the user interaction from the intentionality recognizer 208 and evaluates the relationship between the element that the user interacted with and additional elements. This can be accomplished using either a first mode that stores all additional elements that have the same user interaction in the task context grammar database 214 or a second mode that stores only control functions in the task context grammar database 214, while requiring further analysis on all user interactions with non-control functions.

The mask generator engine 216 receives the user interaction along with the active task context associated with the user interaction from the task context grammar database 214. The mask generator engine 216 has a first output coupled to the dynamic mask definition database 217 to store the virtual masks and a second output coupled to the software interface 206 to pass the user interaction to the underlying software application. The mask generation engine 216 generates the first virtual mask based on the data received from the application UI layout and functional significance mapping database 215. The reconfigured virtual masks are also generated by the mask generator engine 216 based on the received active task context associated with each of the user interactions as described in greater detail below. Each of these virtual masks will be stored in the dynamic mask definition database 217, which is accessible by the touch event preprocessor 202.

Figure 4:
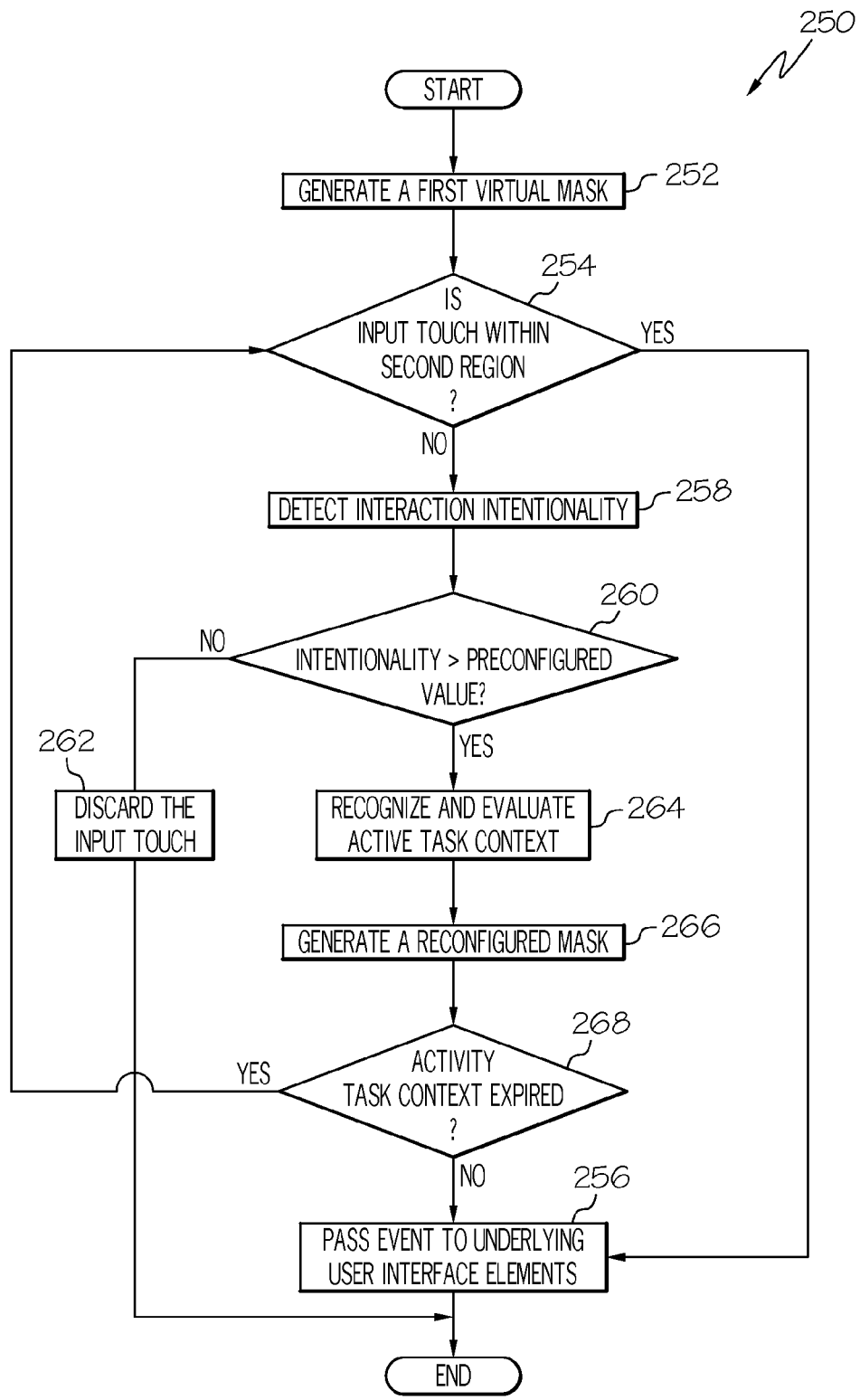
FIG. 4 is a flow chart of a software mask control method in accordance with an exemplary embodiment.

FIG. 4 is a flow chart 250 of a software mask controller method in accordance with an exemplary embodiment. The process begins by generating a first virtual mask, (STEP 252). A user interaction is then detected on the touch screen interface (102, FIG. 2) and the location is compared with the first virtual mask (STEP 254). If the user interaction is within a second region of the virtual mask, the user interaction will be passed to the underlying software interface (STEP 256). However, if the user interaction is within a first region of the virtual mask, the user interaction intentionality is determined in STEP 258. In STEP 260, the user interaction intentionality is compared with a corresponding predetermined user interaction intentionality. If the user interaction intentionality does not satisfy a predetermined characteristic associated with the predefined intentionality profile, the user interaction is discarded and an invalid result is registered (STEP 262). However, if the user interaction intentionality satisfies the predetermined characteristic associated with the predefined interactional profile, the active task context will be recognized and evaluated (STEP 264). The first virtual mask is then reconfigured in accordance with the active task context in STEP 266. In STEP 268, the software mask controller determines if the active task context has expired. If the active task context has expired, then the user will start at the beginning of the process at STEP 254. However, if the active task context has not expired, then the user interaction will be passed to the underlying software interface.

Figure 5:
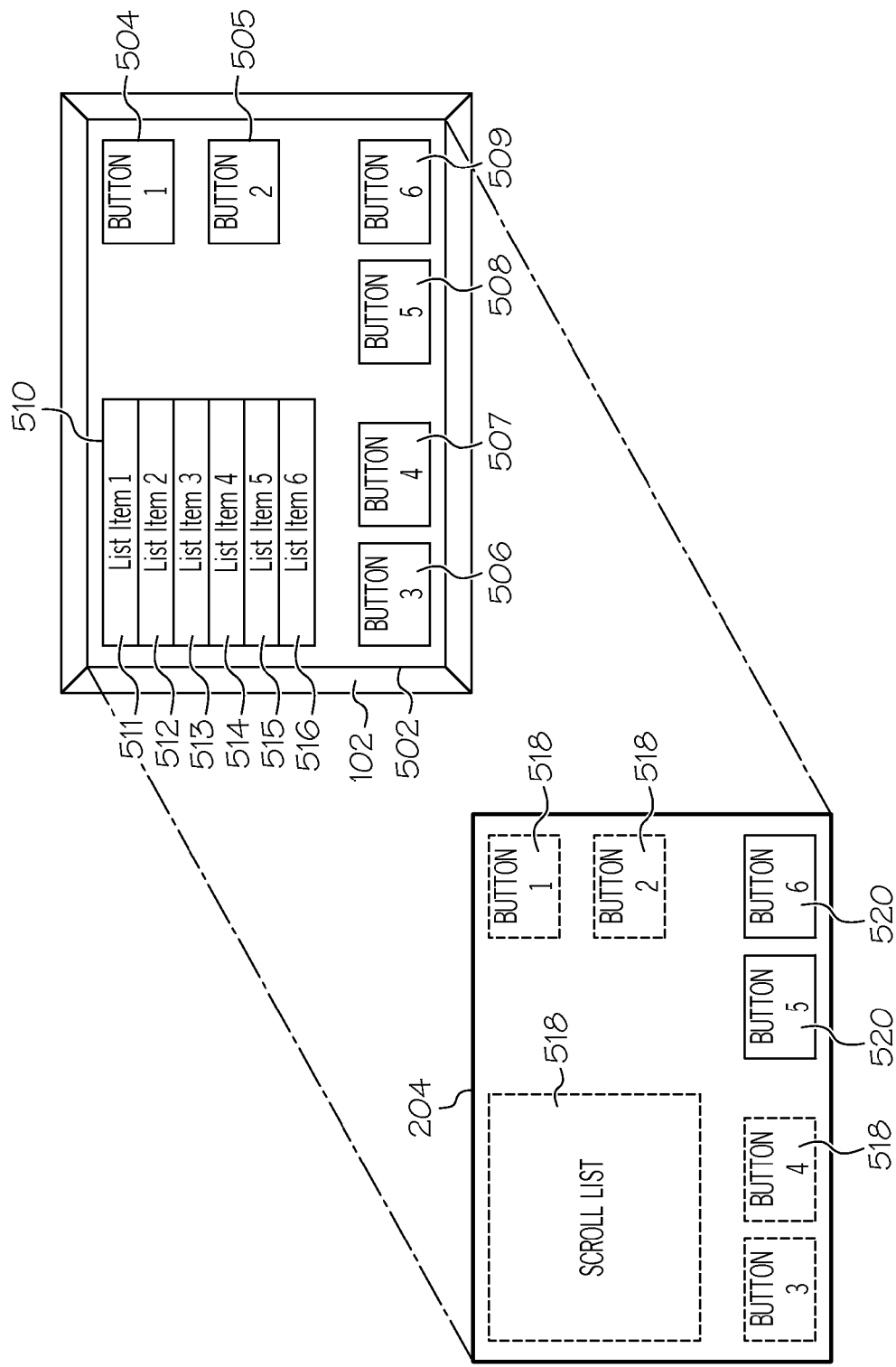

FIG. 5 is an illustrative exemplary embodiment of a first virtual mask 204, and FIG. 6 is a spreadsheet 600 of the characteristics associated with each element contained in the UI image 502. The UI image 502 contains a plurality of elements displayed on a touch screen interface 102. The elements can be classified as either control functions (e.g. 504-09 and 511-16) or non-control functions (e.g. 510). A control function can activate a function of the machine, (e.g. autopilot on an aircraft) while a non-control function allows the user to alter the UI image 502 (e.g. changing the displayed elements contained inside of a scroll list). While an exemplary UI image 502 is shown in this embodiment, it will be appreciated that the concepts disclosed herein can be extended to a variety of other UI elements 502, including but not limited to drop down files and other elements. It should also be appreciated that certain non-control function elements displayed on the UI image 502 may require the user to interact with multiple elements to select the control function. For example, a scroll list 510 may require the user to scroll through the list of elements to display the desired element 513, and then the user would have to select the element by tapping the object 513.

Spreadsheet 600 lists the plurality of elements shown in FIG. 5 and the associated characteristics for each element. The columns of the spreadsheet 600 contains the characteristics of the elements (e.g. Page ID 602, Graphical Element ID 604, Layout Definition 606, Affordance Type 608, and Significance Level 610), while the rows of the spreadsheet 600 contain the elements (e.g. ScrollList1 620 and Button1 624-Button6 629). The Page ID 602 identifies the page the element is displayed on, while the Graphical Element ID 604 is the symbology that is displayed on each element. The Layout Definition 606 contains the position and size of each element, and the Affordance Type contains the required user interaction type for activation of the element. For example, a TAP would require the user to contact the touch screen for a short period of time while remaining in substantially the same location. The Significance Level 610 is defined by the user or designer and is based on various parameters including but not limited to, the function that the element controls (e.g. auto pilot, cabin light, etc.), location on the UI image, size of the element, other associated elements, other elements in close proximity, etc.

Each element contained in the spreadsheet 600 and displayed on the UI image 502 may have various associated characteristics. For example, ScrollList1 displayed in column 604 permits two different affordance types 608 (e.g. List_Scroll column 608, row 620 and Item_Select column 608, row 622). This is due to the fact the user may have to perform two different interactions with ScrollList1 (e.g. scroll through the displayed elements and select the desired element). The user or designer may assign a lower significance level "4" to the List_Scroll affordance type, as compared to the Item_Select affordance type with an assigned significance level of "8". This may be desirable because there is no risk of inadvertent activation of a control function with the List_Scroll Affordance Type, while there is a risk of inadvertent activation with the Item_Select Affordance Type. This permits the user or designer to modify the system to meet specific design requirements. It should be appreciated that a virtual mask can have more than two regions, each associated with different criteria. The number of virtual mask regions and their associated criteria may be altered to meet the design requirements of the system.

The first virtual mask layer 204 is overlaid on the UI image 502. The illustrated embodiment displays the first virtual mask 204 as having a first region comprised of a plurality of closed regions 518 and a second region comprised of a plurality of open regions 520. The first virtual mask 204 is generated by comparing the associated significance levels 610 of each element to a user determined threshold level. If the significance level is below the threshold level, then a region of the virtual mask bounded by the element is removed creating an open region. However, if the significance level is greater than the threshold level, then the region will remain a closed region. For example, the exemplary list shown in FIG. 6 is used to create the first virtual mask 204 shown in FIG. 5. The user or designer in this embodiment set the threshold level to "3", creating open regions over Button5 in row 628 and Button6 in row 629. This is due to their significance levels (column 610) below "3". All other elements contained in the spreadsheet have significance levels above "3", requiring the regions of the virtual mask over these elements to remain closed.

Figure 7:
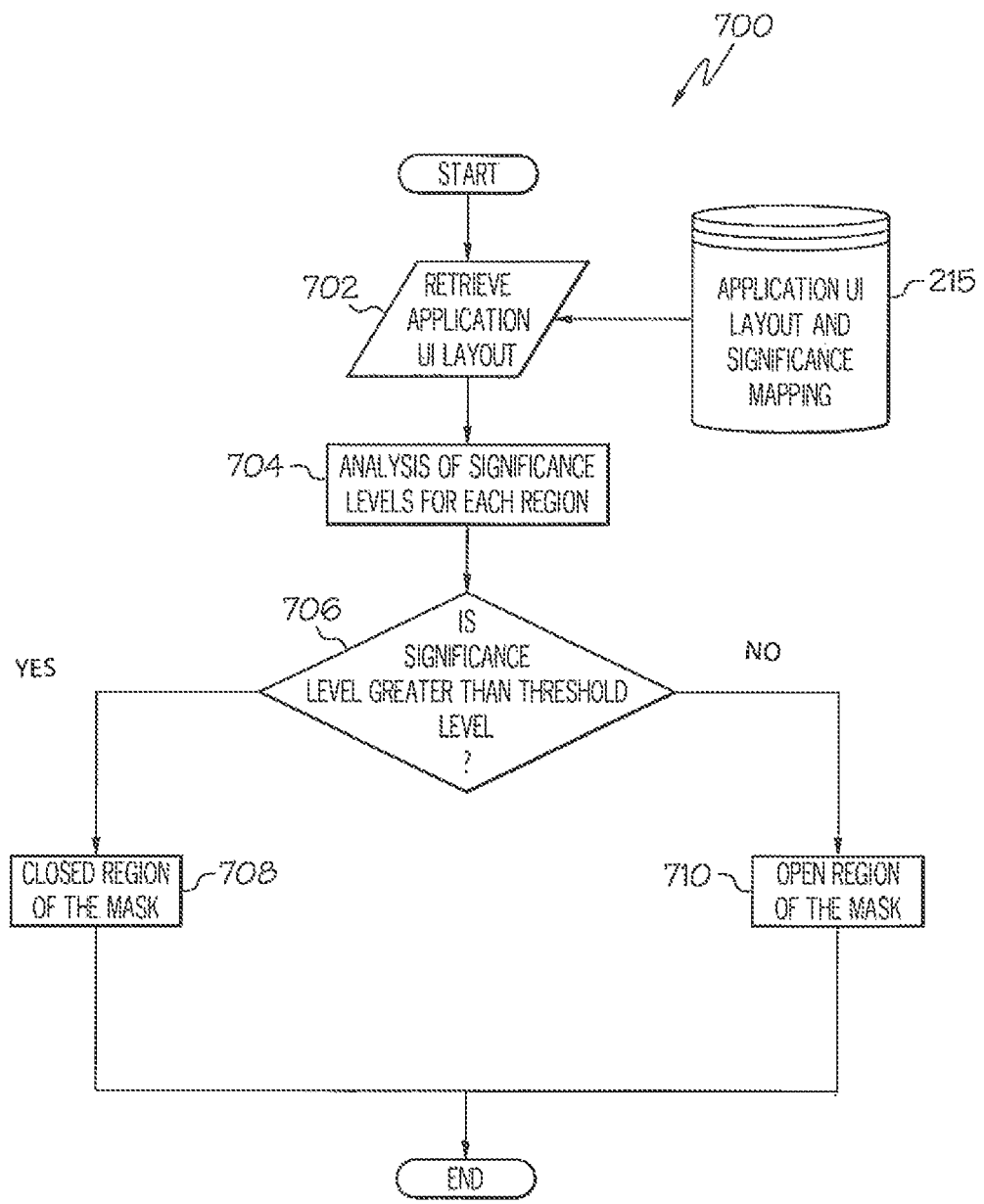
FIG. 7 is a flow chart of a virtual mask generation process in accordance with an exemplary embodiment.

FIG. 7 is a flow chart 700 of a virtual mask generation process in accordance with an exemplary embodiment. The UI image of a software application and the associated significance levels of each element are retrieved from the application UI layout and functional significance mapping database (STEP 702). Each element's significance level is analyzed (STEP 704) and compared to a threshold level (STEP 706). If the significance level is greater than the threshold level, then a closed region of the virtual mask remains over the element (STEP 708). However, if the significance level is less than the threshold level, then an open region is created in the virtual mask (STEP 710).

Figure 8:
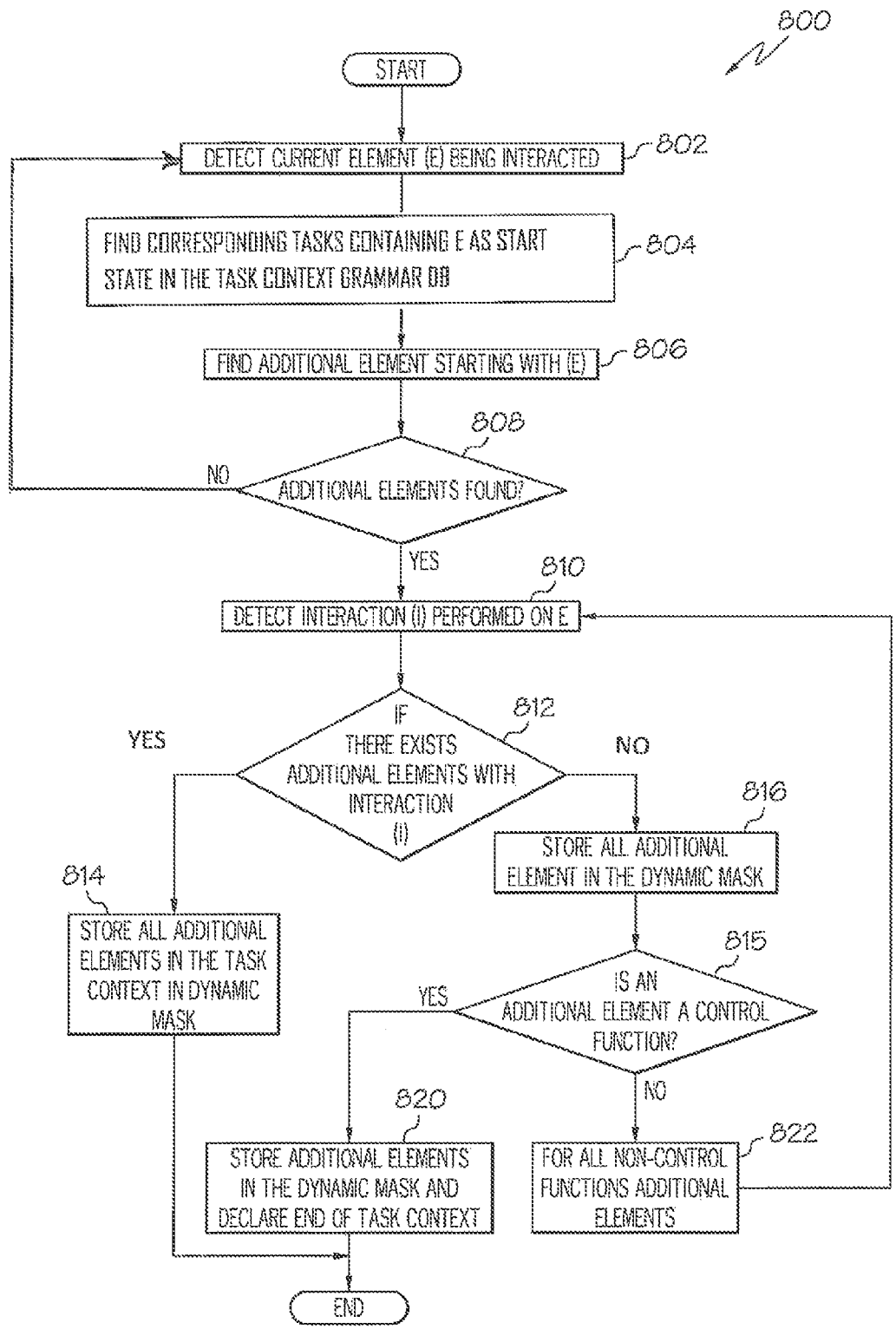
FIG. 8 is a flow chart of a task context evaluation engine process in accordance with an exemplary embodiment.

FIG. 8 is a flow chart 800 of a task context evaluation engine process in accordance with an exemplary embodiment. The task context evaluation engine (212 in FIG. 2) accepts the user interaction from the intentionality recognizer (208 in FIG. 2) and evaluates the relationship between an element the user interacted with and additional elements of the UI image. This process begins by detecting a first element that the user interacted with (STEP 802). In STEP 804, corresponding tasks containing the first element as a start state are discovered. Then additional elements are found that interact with the first element (STEP 806). If none are found (STEP 808), then the first element is stored in the task context grammar database (214 in FIG. 2) and is determined to be a control function. However, if additional elements are found (STEP 808), then the user interaction type performed on the first element is detected (STEP 810). If additional elements exist with the same user interaction type, they are stored in the task context database. However, the user may select one of two different modes for determining which additional elements are stored (STEP 812). The first mode stores all additional elements that have the same user interaction in the task context database (STEP 814). The second mode, stores all additional elements in a temporary database (STEP 816). In STEP 818, all additional elements that were stored in the temporary database are analyzed to determine if they are control functions. If the additional elements are determined to be control functions, then they are stored in the task context database (STEP 820). In STEP 822, if the additional elements are not a control function, then the steps of detecting a user interaction type (STEP 810), comparing the user interaction to additional elements (STEP 812), storing all additional elements in a temporary database (STEP 816), and determining if the additional elements are control function (STEP 818) are repeated until all additional elements are control functions.

Referring back to FIG. 2, the mask generator engine 216 generates the first reconfigured virtual mask in accordance with the first or second mode for analyzing the active task context described in connection with FIG. 8. If the first mode for analyzing the active task context is selected, the virtual mask is reconfigured to only permit user interactions with elements that were stored in the task context database 214. For example, if a user interaction is detected with a scroll list which contains a list of elements. The active task context for the scroll list is analyzed in the task context evaluation engine 212 and only the list of elements inside the scroll list are found to interact with the scroll list. Thus, the first reconfigured virtual mask only opens regions on the mask that are bounded by the elements contained in the scroll list. In addition, the first reconfigured virtual mask only permits user interaction with open regions of the mask to reduce inadvertent user interactions.

If the second mode for analyzing the active task context is selected in FIG. 8, the subsequent reconfigured virtual mask may be created in response to each user interaction; e.g. if a user desires to change a course heading of the aircraft. The user may first interact with an element contained in the UI image that activates a menu containing a number pad. The active task context is evaluated by the task context evaluation engine 212 and determines that the elements contained in the number pad are the only elements that interact with the menu. Thus, the first reconfigured virtual mask only opens regions bounded by the elements contained in the number pad. If a second user interaction is detected associated with entering the desired heading, a conformation element is then displayed and the second reconfigured virtual mask is again generated to prevent all user interaction with other elements except the conformation element.

Thus, there has been provided a novel software mask controller and method for interacting with a touch screen interface that reduces inadvertent user interactions. This is accomplished with the use of an intelligent virtual stencil mask. This practical solution evaluates the significance of each element to employ a virtual mask system that prevents user interactions in certain regions and requires additional processing of the user interaction in other regions. This method reduces inadvertent interactions, while the control function interface interaction characteristics (time on task, workload, accessibility, ease of use etc.) remains equivalent to the interface available in non-touch screen flight decks or through alternate control panels.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for operating a touch screen interface, the method comprising:
    generating a first virtual mask having a first region thereon;
    generating a first reconfigured virtual mask in response to a user interaction with the first region;
    generating a second region on the first reconfigured virtual mask that interacts with the first region of the first virtual mask;
    detecting a user interaction with the first region of the first virtual mask;
    generating a user interaction intentionality profile;
    determining if a predefined characteristic of the user intentionality profile satisfies a predetermined criteria associated with a predefined intentionality profile;
    detecting a user interaction with the second region of the first reconfigured virtual mask; and
    generating a second reconfigured virtual mask in response to a user interaction with the second region of the first reconfigured virtual mask.

2. The method of claim 1 wherein the first region has a significance level greater than a threshold level.

3. The method of claim 2 further comprising:
    detecting a user interaction with the first region;
    generating a user interaction intentionality profile; and
    comparing the user interaction intentionality profile with a predetermined user interaction intentionality profile.

4. The method of claim 3 wherein the step of generating a user interaction intentionality profile, comprises:
  separating the user interaction into a plurality of zones, each having an associated amplitude; and
  weighting the amplitudes of the plurality of zones.

5. The method of claim 3 further comprising:
  rejecting the user interaction intentionality profile if a predefined characteristic of the user intentionality profile does not satisfy a predetermined criteria associated with a predefined intentionality profile; and
  activating a control function associated with the first region if the user intentionality profile satisfies the predetermined criteria.

6. The method of claim 1 further comprising:
  retrieving a significance level associated with a second region;
  determining if the significance level of the second region is less than a threshold level; and
  generating the second region on the first virtual mask.

7. The method of claim 6 further comprising:
  detecting a user interaction with the second region; and
  activating a control function in response to the user interaction.

8. A touch screen controller system onboard an aircraft, comprising:
  a touch screen interface; and
  a processor configured to (a) generate a first virtual mask on the touch screen interface having a first region thereon; (b) generate a reconfigured virtual mask on the touch screen in response to detecting a user interaction with the first region; (c) generate a second region on the first reconfigured virtual mask that interacts with the first region of the first virtual mask; (d) detect a user interaction with the first region of the first virtual mask; (e) generate a user interaction intentionality profile; (f) determine if a predefined characteristic of the user intentionality profile satisfies a predetermined criteria associated with a predefined intentionality profile; (g) detect a user interaction with the second region of the first reconfigured virtual mask; and (h) generate a second reconfigured virtual mask in response to the user interaction with the second region of the first reconfigured virtual mask.

9. The system according to claim 8 wherein the processor is further configured to:
  (i) reject the user interaction intentionality profile if a predefined characteristic of the user intentionality profile does not satisfy a predetermined criteria associated with the predefined intentionality profile; and (j) activate a control function associated with the first region if the user intentionality profile satisfies the predetermined criteria.

10. The system according to claim 9 wherein the processor is further configured to:
  (k) retrieving a significance level associated with a region; (l) determine the associated significance level is less than a threshold level; and (m) activate a control function in response to the user interaction with the second region.

* * * * *